UNITED STATES PATENT OFFICE.

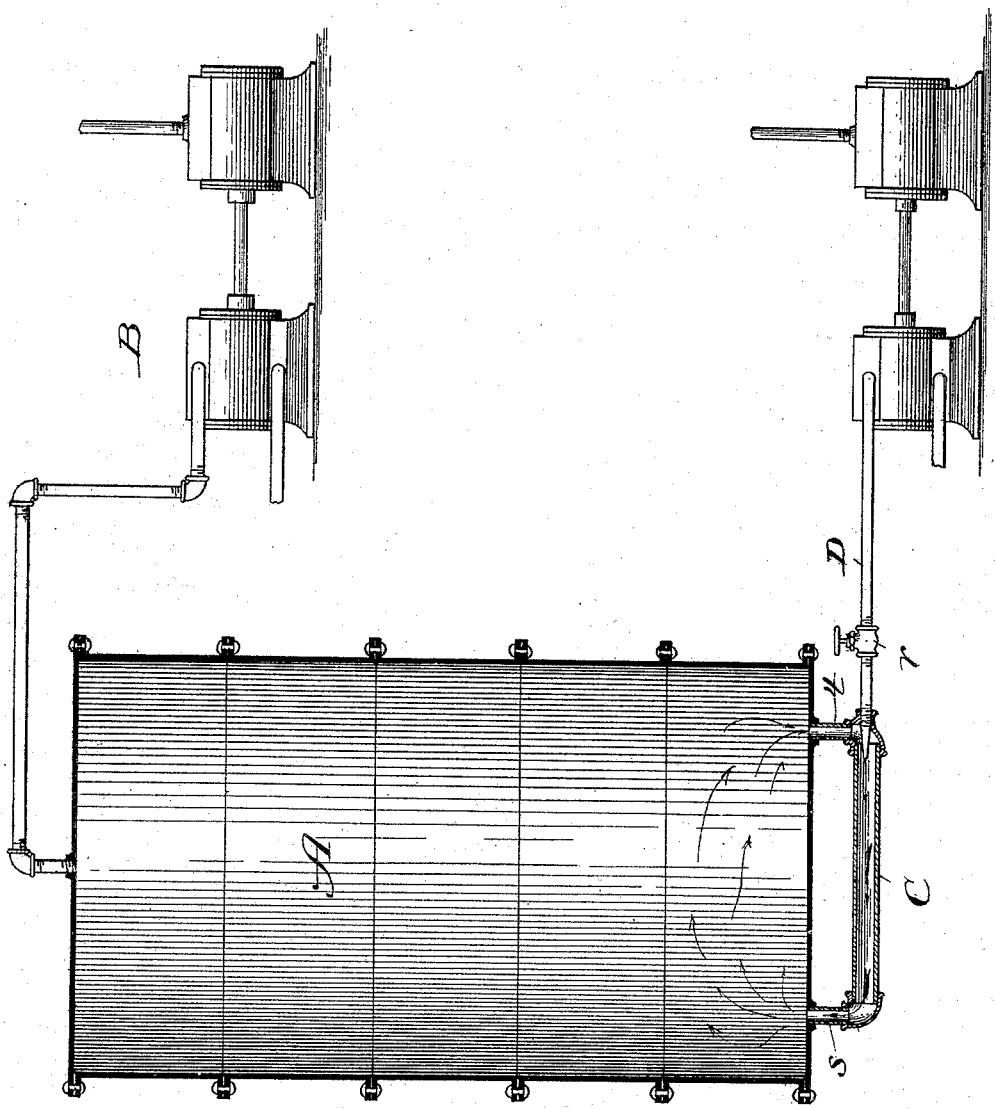

AUGUST HUMMEL, OF CHICAGO, ILLINOIS, ASSIGNOR TO CHARLES C. PUFFER, OF ROCHESTER, NEW YORK.

MANUFACTURE OF BEER.

SPECIFICATION forming part of Letters Patent No. 492,292, dated February 21, 1893.

Application filed December 1, 1891. Serial No. 413,679. (No specimens.) Patented in England March 8, 1892, No. 4,688; in Belgium March 11, 1892, No. 98,743; in Cape of Good Hope May 31, 1892, No. 246; in France June 20, 1892, No. 220,059, and in Canada June 24, 1892, No. 39,199.

*To all whom it may concern:*

Be it known that I, AUGUST HUMMEL, a citizen of the United States, residing at Chicago, in the county of Cook and State of Illinois, have invented a new and useful Improvement in the Manufacture of Beer, of which the following is a specification.

I have received foreign Letters-Patent for said invention as follows: English, March 8, 1892, No. 4,688, Belgian, March 11, 1892, No. 98,743, Cape of Good Hope, May 31, 1892, No. 246, French, June 20, 1892, No. 220,059, and Canadian, June 24, 1892, No. 39,199.

My invention relates to a new process of manufacturing beer, and has for its object the manufacture of lager-beer, so called, by a process which shall reduce the ordinary period involved in the manufacture from several months to a few days. Lager-beer derives its name from the fact that under the common process of manufacture after mashing, abstracting, boiling, hopping, cooling and fermenting in the main fermenting-vat, it is retained in storage, ruh, or lager-casks for a period generally in excess of two months more or less, during which retention in the storage-cask the secondary or subsidiary fermentation is permitted to proceed to substantially the absolute completion. The kind of beer thus produced is the kind to which the present invention relates; but, as before stated, the purpose of the invention is to bring about the complete manufacture of the beer in a brief period, not exceeding one month.

The ordinary procedure heretofore practiced in the manufacture of lager-beer has been the following: The mash having been made and the wort abstracted and boiled, hopped and cooled, as above stated, the latter is conveyed to a settling-tank, and thence after settling to the main fermentation-vessel where the yeast is commonly added (though it is frequently added in the settling-tank and occasionally even as far back as the receptacle which receives it from the cooler) and after the yeast has taken hold of the wort, or, as it is termed in the art, after the wort has been "pitched" with the yeast, a violent fermentation accompanied by a rapid reproduction of the yeast takes place with the production of "kraeusen" or young beer as evidenced by the formation of a white curly cap of foam. The main fermentation ordinarily takes about two weeks. The beer, preferably after skimming, is thereupon transferred to the lager, ruh, or storage casks (the greater portion of the yeast being left in the main fermenting-vats) where it is retained until the secondary fermentation has been completed, which rarely requires less than two months and sometimes requires as much as five months. The secondary fermentation may, however, be conducted in the main fermenting-vats without the transfer to separate ruh or storage-casks, but while similar to the first, so far as the production of alcohol and carbonic acid gas is concerned, it differs from the main fermentation in certain recognized particulars, and brewers are familiar with the line of demarcation between the main or primary and the subsidiary or secondary fermentation, the distinction between the two being apparent upon examination of the beer and uniformly identified among brewers by the terms main and secondary or after fermentation. More accurately defined it may be said that the differences between the two fermentations are the following: the main fermentation causes the formation of new yeast-cells, while in the secondary fermentation the reproduction of yeast plant is stopped; the main fermentation produces a decomposition of maltose, while in the secondary fermentation the remaining small amount of sugar, the "iso maltose" is decomposed; in the main fermentation the continual evolution of carbonic acid gas keeps the yeast cells floating and suspended in the liquor, while in the secondary fermentation yeast is eliminated and settles and the beer gets clear; in the main fermentation the temperature rises considerably and has to be checked by ordinary means, while in the secondary fermentation the temperature gradually falls to a point near freezing point. In the main fermentation the wort running from the kettle is usually cooled down to about 42° Fahrenheit, yeast is added and the temperature allowed to rise to 52° Fahrenheit; a very pure yeast may even allow the temperature to go up to 57° Fahrenheit without danger; by means of so-called attemperators the remaining liquid is then slowly cooled to about 40° Fahrenheit. In the secondary fermentation the beer shows a pronounced attenuation, and in this fermentation the beer is cooled further to about 34° Fahrenheit. I have found by examination and experiment that the distinction is quite as definite when both the main and secondary fermentations are conducted in a single vessel as when they are conducted in separate vessels, the difference being readily noticeable if the beer after the completion of the main fermentation be permitted to remain in the same vessel without removal. Brewers, however, do not, if they can avoid it, allow beer to remain even for a day on the yeast after the first fermentation is complete, and it is found that the racking off of the beer permits the secondary fermentation, in the way of brewing hitherto practiced, to continue more satisfactorily and without contamination from precipitated deleterious elements, if such exist. After the completion of the secondary fermentation it is usual to rack the beer into shavings or bunging casks where a fining medium, such as isinglass, is introduced, together with young beer called "kraeusen" obtained from the main fermenting vessel, a new fermentation being thus excited generating carbonic acid gas, and a bunging apparatus being applied to cause this finishing to take place under a predetermined pressure obtained from the rising carbonic acid gas. The pressure generally found most desirable is from five to seven pounds.

For the purpose of expediting the manufacture of beer, a vacuum has been applied to the beer during the stage of secondary fermentation, the vacuum being employed with a cool atmosphere, always necessary, and being made continuous and coupled with the abstraction of gaseous products of fermentation as they accumulate at the top of the vessel. By this means, the secondary fermentation is materially hastened without in any degree interfering with its completion, the period being reduced to less than ten days, instead of from one to five months as heretofore required. This process forms the subject matter of Letters Patent granted to Caspar Pfaudler, No. 318,793, dated May 26, 1885.

The patent referred to of Caspar Pfaudler is explicitly limited to, the treatment of beer produced by lower or bottom fermentation in the stage of secondary fermentation for the purpose of hastening the aging or ripening of the beer, and the specification of the said patent states that the main fermentation may be conducted in the usual way in open vats, which is the one contemplated by the patentee, but that if it should ever be found practicable to conduct the main fermentation *in vacuo* the beer thus obtained might be subjected to the treatment covered by his patent.

I am well aware that it has been heretofore suggested that certain fermented beverages produced by upper fermentation might, with advantage, have their main fermentation conducted or begun under a reduced pressure or partial vacuum, (though whether or not this was done with beneficial results does not appear.) Such a suggestion is found in the English patent to Robertson, No. 2,294, of 1859 and the United States patent to Sheridan, No. 245, June 30, 1837. Undoubtedly, however, in all cases where the main fermentation of the beverage has been conducted under a partial vacuum the operation has taken place under conditions of temperature usually in excess of 60° Fahrenheit and other conditions entirely incompatible with the manufacture of lager-beer or beer produced by what is described as lower or bottom fermentation.

I have found that by observing certain provisions, hereinafter set forth, the main fermentation of lager-beer may be conducted under a partial or approximate vacuum with beneficial results of a high order, both in the saving of time, labor and cost and in the quality of the product, and that my invention may be used with great advantage in conjunction with the invention of Caspar Pfaudler, above referred to.

My invention consists broadly in retaining the wort pitched with yeast in a closed vessel and abstracting atmospheric air and gaseous products of fermentation as they accumulate in the upper part of the vessel, thereby creating a partial or approximate vacuum, and maintaining the fermenting wort at a certain requisite temperature, as hereinafter described, until the main fermentation is completed, as a preliminary to subjecting the beer to an aging or ripening treatment by secondary fermentation.

It consists further in conducting the main fermentation of the wort under a partial or approximate vacuum, as last above set forth, and thereupon and in the same vessel subjecting it as a continuation of the first operation to the aging or ripening process, which forms the subject of the Letters Patent granted to Caspar Pfaudler aforesaid; and my invention consists further in conducting the main fermentation of the wort in a closed vessel under proper provisions, as to temperature hereinafter set forth, abstracting atmospheric air and gaseous products of fermentation as they accumulate in the upper part of the vessel, thereby producing a partial or approximate vacuum, and, as hereinafter described, supplying the fermenting wort with atmospheric air in regulated quantity.

I have found in practicing my invention in the manner above outlined, and hereinafter more fully pointed out, that the step of racking the beer off the sediment obtained in the main fermentation vat according to the practice heretofore in vogue, is unnecessary, although it may be practiced without departing from my invention. As before stated, the purpose of this racking has been to withdraw the beer from contact with the sedimentary matter of a character calculated to produce a deleterious action upon, or to contaminate the beverage; but, by reason of the abstraction of atmospheric air and the withdrawal of the accumulated products of fermentation, such deleterious action by the sedimentary matter is found to be neutralized or prevented, and the access to the beer undergoing the main fermentation of deleterious ferments from the surrounding atmosphere, or other external sources, is also prevented.

The accompanying drawing represents a closed fermenting vat provided with an air-pump adapted to abstract from the upper part atmospheric air and gaseous products of fermentation which accumulate, and provided at its lower end with means for introducing, at will, atmospheric air into the fermenting liquid, adapted also, as a preferred construction, to create an agitation and circulation of the wort.

In the drawing: A represents a fermenting vat, of which in the practice of my invention there may be one or several, and B a vacuum-pump connected to the upper part of the fermenting vat, or to each of the several fermenting vats where more than one is employed, since obviously one vacuum pump may be made to serve for a series of fermenting vats. The base of each fermenting vat should be provided with one or more controllable air inlets whereby atmospheric air, preferably previously sterilized by filtration, heat or other suitable sterilizing or purifying process, may be injected or admitted into the liquid and pass through the same.

I have represented the device for injecting or admitting atmospheric air in the form of a pipe C below the vat having two branches $t$ and $s$ entering the base of the vat, and a pipe D, smaller in diameter than the pipe C, entering the latter and extending beyond the branch $t$. The only communication between the air-pipe introduced and the interior of the pipe C is by way of the pipe D. When it becomes desirable to impregnate the fermenting wort with atmospheric air a valve $r$ in the pipe D is opened, when atmospheric air at normal pressure, or any other pressure that may be desired, rushes through the pipe D into the pipe C and by its direction, based upon familiar physical laws, causes a circulation of the wort and the sediment associated with it through the branches $s$ and $t$ and pipe C in the direction of the arrow, thus bringing the molecules of wort and the associated yeast successively into contact with the air. This is found in practice to have a tendency to revivify the yeast causing the fermentation to proceed more rapidly and effectively. Of course all the introduced air does not take the course of the arrows but a portion of it proceeds directly upward through the wort to the relief of the vacuum at the top; and in this way atmospheric air is disseminated throughout the body of the liquid, the effect of which is to maintain and accelerate the fermentation.

The device illustrated for introducing atmospheric air into the fermenting wort is to be regarded only as a preferred form, since, obviously, the atmospheric air may be introduced by other means, such as a single pipe or set of pipes, or controllable inlets entering the fermenting vat either at the base or elsewhere; but in practice it will be found desirable to have the several air-inlets, however they may be located, controlled by means of a valve common to all. It is contemplated that in the progress of the fermentation atmospheric air will be introduced into the wort as circumstances require; that is to say if the wort be found to be fermenting too slowly atmospheric air may be introduced by means of the device provided for this purpose in sufficient quantity and at a proper temperature to accelerate to the required degree. In the course of fermentation this necessity may in some cases not arise at all and in others it may arise once or oftener.

The introduction of air as above set forth, will often be found advantageous during the progress of the secondary fermentation, and when found desirable during this stage it may be applied in the manner described above.

In carrying out my process the prepared wort is introduced into the fermenting vat, or series of fermenting vats, represented by A and through an inlet pipe $q$, or any other suitable inlet pipe, and is either pitched with yeast before the introduction or after it. I deem it preferable to pitch the wort with yeast before the introduction, but so far as my process is concerned it is only necessary that the wort shall be properly pitched with yeast at the time the vacuum is applied. When the yeast has begun to act upon the wort producing fermentation, or previously, or even subsequently, I set the vacuum-pump in action withdrawing the atmospheric air and carbonic acid gas that occupy the space within the vessel above the liquid, or a considerable portion of the same and thereby produce a partial or approximate vacuum, preferably of about eighteen inches, and by the action of the pump I ordinarily maintain this vacuum at approximately the pressure named, though it may vary temporarily. When atmospheric air is introduced by the means for that purpose above described, the degree of vacuity may be gradually or temporarily increased or decreased, as occasion seems to demand. This is a matter which will always be more or less within the discretion and experience of the brewer.

Ordinarily in the manufacture of lager-beer the wort is introduced into the fermenting vat at a temperature of about 41° Fahrenheit. A physical effect of fermentation is to increase the temperature and as beer has heretofore been manufactured it has been necessary for brewers to exercise great caution to prevent an undue rise of temperature from this cause, since the effect of an undue rise (above say 48° Fahrenheit) is hurtful to the product. Where a tendency to rise above the degree mentioned has been manifested in the wort it has been customary heretofore to counteract it by extraneous cooling agencies, such for example as the application of what is technically called a "swimmer" or attemperator. The temperature of the fermenting room is usually maintained uniform at about 41° Fahrenheit; but the temperature of the room does not control the temperature of the wort sufficiently, owing to the inherent heating tendency of fermentation. In the practice of my process the brewer is largely relieved from the necessity of observing and controlling the temperature of the wort, because my process will operate with perfect success even though the temperature of the wort be several degrees higher than would be permissible in the ordinary way of brewing. Under all circumstances the theoretical limit of temperature at which the main fermentation may be successfully conducted is for the room about 45° Fahrenheit and for the wort about 55° Fahrenheit; but under the ordinary practice the practical limit is several degrees below the theoretical limit as above expressed. My process, however, permits the fermentation to be conducted at substantially the theoretical limit of temperature and even renders this limit desirable; that is to say when the main fermentation is conducted according to my invention, as above set forth, the temperature of the cellar may be not lower than about 45°, and the temperature of the wort may, under the influence of fermentation, be permitted to rise as high as 55°, or thereabout, without injury to the product, and under proper precaution even with benefit to it. If, however, the temperature of the wort be permitted to rise too high during fermentation, I have found by experience that the beer is liable to acquire an undesirable quality due, in my opinion, to the fact that the yeast, by reason of the unduly high temperature tends toward the quality of yeast which is productive of upper fermentation. Moreover, the tendency of unduly high temperature in the wort is to develop deleterious ferments which necessarily, when the fermentation is conducted in open vessels, having free access to the wort operate to injure it. In my process, however, the vessels being closed to the external atmosphere, and the gaseous products of fermentation being abstracted as they accumulate, no deleterious ferments are admitted from external sources, and those already in the wort have their action more or less suspended.

My process, therefore, besides its other advantages permits a material saving in the cost of refrigeration, since the temperature of the fermenting room may, without disadvantage and even under some circumstances with advantage to the product be maintained several degrees higher than that usually found necessary and the use of the "swimmer" or attemperator may practically be dispensed with.

The average time required for the main fermentation, as heretofore practiced, is about fourteen days. With my process the main fermentation may be perfected in from six to eight days, and not only this, but comparative tests of beer manufactured by my process and beer manufactured by the usual process show that better results are obtained with from six to eight days' fermentation in the former than with fourteen days, or even more in the latter.

What I claim as new, and desire to secure by Letters Patent, is—

1. In the manufacture of beer by bottom or lower fermentation, the process of conducting the main fermentation under a partial or approximate vacuum, which consists in confining the wort pitched with yeast in a closed vessel, abstracting from above the liquid atmospheric air and the gaseous products of fermentation as they accumulate, and maintaining the wort during the progress of fermentation, at a temperature not exceeding 60° Fahrenheit substantially as described.

2. In the manufacture of beer by bottom or lower fermentation the process of conducting the main fermentation and subsequently aging or ripening the product under a partial or approximate vacuum, which consists in confining the wort pitched with yeast in a closed vessel, abstracting from above the liquid atmospheric air and the gaseous products of fermentation as they accumulate, maintaining the wort at a temperature not exceeding 60° Fahrenheit during the progress of fermentation until the main fermentation is completed, and then in the same vessel continuing the abstraction of gaseous products of fermentation and atmospheric air, if any, at the reduced temperatures in the liquid requisite for aging and ripening the beer, substantially as described.

3. In the manufacture of beer by bottom or lower fermentation, the process of conducting the main fermentation under a partial or approximate vacuum, which consists in confining the wort pitched with yeast in a closed vessel, abstracting from above the liquid atmospheric air and the gaseous products of fermentation as they accumulate, maintaining the wort at a temperature not exceeding 60° Fahrenheit and introducing atmospheric air into the body of the wort during the progress of fermentation, substantially as described.

4. In the manufacture of beer by bottom or lower fermentation the process of conducting the fermentation under a partial or approximate vacuum, which consists in confining the beer charged with yeast remaining from the main fermentation in a closed vessel, abstracting atmospheric air, if any, and the gaseous products of fermentation as they accumulate above the liquid, maintaining the liquid at a temperature not exceeding 60° Fahrenheit and introducing into the liquid during the progress of fermentation atmospheric air, substantially as described.

5. In the manufacture of beer by bottom or lower fermentation the process of conducting the main fermentation which consists in confining the wort, pitched with yeast in a closed vessel, abstracting in whole or in part the atmospheric air and gaseous products of fermentation from the upper part of the vessel maintaining the fermenting wort at a temperature not exceeding 60° Fahrenheit, and introducing atmospheric air into the lower part of the vessel and into the sedimentary matter thereby increasing fermentation and producing a circulation of the wort under the impulse of the introduced air, substantially in the manner and for the purpose described.

AUGUST HUMMEL.

In presence of—
J. N. HANSON,
M. J. FROST.